May 23, 1972 H. R. UHTENWOLDT 3,664,718
TOOLHEAD
Filed Sept. 21, 1970
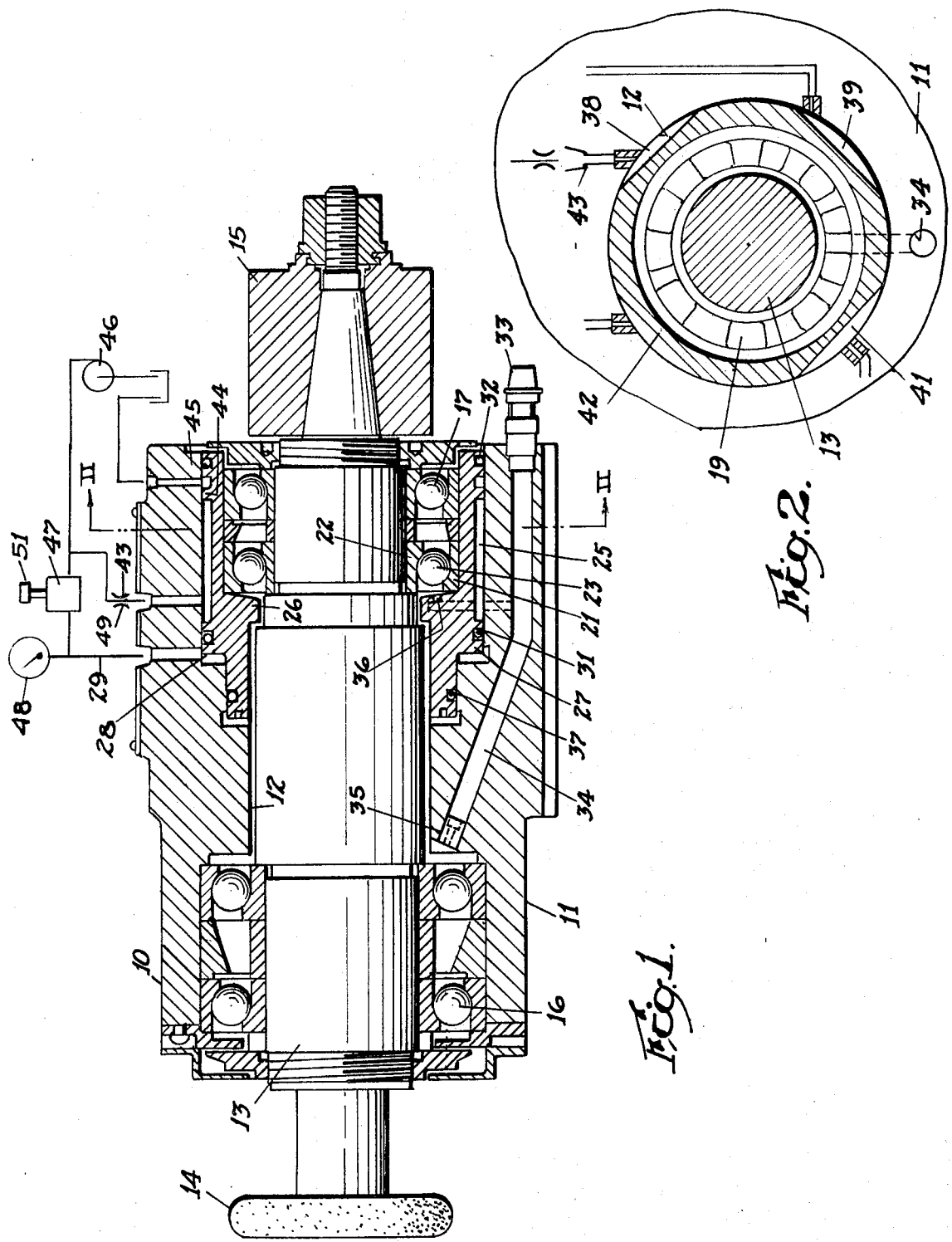
Inventor: Herbert R. Uhtenwoldt
BY Aaron S. Blodgett
ATTORNEY though a grinding machine has been mentioned as an example —

United States Patent Office 3,664,718
Patented May 23, 1972

---

3,664,718
TOOLHEAD
Herbert R. Uhtenwoldt, Worcester, Mass., assignor to The Heald Machine Company, Worcester, Mass.
Filed Sept. 21, 1970, Ser. No. 74,001
Int. Cl. F16c 23/06
U.S. Cl. 308—189 A                5 Claims

ABSTRACT OF THE DISCLOSURE

This invention relates to a toolhead and, more specifically, to apparatus for mounting a spindle in anti-friction bearings and subjecting the bearings to a preload force.

BACKGROUND OF THE INVENTION

There are many occasions where it is advantageous to mount a machine tool spindle in anti-friction bearings. When this is done, it is necessary to preload the bearings to obtain spindle rigidity and to assure that the tool on the spindle generates a true circle. The usual practice is to mount springs between a pair of the bearings and to allow the bearing outer race to slip axially in the housing (or to allow the inner races to slip on the spindle). This construction allows the race to move when it is necessary because of thermally-effected dimensional variation of the spindle and housing. Naturally, the fit of the slidable bearing race is very critical. If the fit is too loose, the bearings run out of alignment, spindle rigidity is too low, and, in the case of a grinding machine for example, grinding chatter develops. If the fit is too tight, the preloading springs are not able to move the race in the housing, so that, when the spindle heats up, excessive play develops, which causes tool chatter. Furthermore, springs do not all have equal force when compressed, so that there is a tendency for the race to cock and cause vibration.

It has been suggested that these problems could be overcome by mounting the outer race (which preloads the spindle) on an axial ball bearing. Unfortunately, the results of this construction are not good, because of the low damping characteristics of balls arranged in this way, since there is low conformity and there are few balls in contact. These and other difficulties experienced with the prior art devices have been obviated in a novel manner by the present invention.

It is, therefore, an outstanding object of the invention to provide a toolhead having high spindle rigidity and concentricity of tool path.

Another object of this invention is the provision of a wheelhead for a grinding machine which is free of grinding chatter.

A further object of the present invention is the provision of a toolhead in which change of temperature does not affect spindle stiffness, concentricity, and vibration.

It is another object of the instant invention to provide a toolhead in which bearing preload may be changed remotely with a change in spindle rotational speed.

Another object of the instant invention is that axial vibration of the spindle may be "tuned out."

With these and other objects in view, as will be apparent to those skilled in the art, the invention resides in the combination of parts set forth in the specification and covered by the claims appended hereto.

SUMMARY OF THE INVENTION

In general, the present invention consists of a toolhead having a housing with a bore extending through it and having a spindle rotatably mounted in the bore and extending therefrom. An anti-friction bearing lies between the spindle and the bore, the bearing having an outer race, an inner race, and rolling elements therebetween. A sleeve is axially slidable in the bore, the outer race being fixed in the sleeve and the outer race being fixed to the spindle. Hydraulic pressure means is provided for causing fluid pressure to bear against the sleeve.

More specifically, a hydrostatic bearing is provided between the sleeve and the bore to provide for the sliding movement of the sleeve in the bore.

BRIEF DESCRIPTION OF THE DRAWINGS

The character of the invention, however, may be best understood by reference to one of its structural forms, as illustrated by the accompanying drawings, in which:

FIG. 1 is a vertical sectional view of a toolhead embodying the principles of the present invention, and FIG. 2 is a transverse sectional view of the invention taken on the line II—II of FIG. 1.

DESCRIPTION OF THE PREFERRED EMBODIMENT

The toolhead, indicated generally by the reference numeral 10, consists of a housing 11 which is adapted to be mounted on a machine tool through which extends a horizontal bore 12. In the bore lies a spindle 13 which extends from both ends of the housing; one end carries a tool such as an abrasive wheel 14, and the other end carries a pulley 15 adapted to be driven by a motor (not shown). Two anti-friction bearings 16 and 17 of the ball bearing type lie between the spindle and the bore. The bearing 17 consists of two complete ball bearing units 18 and 19. The bearing unit 18 consists of an outer race 21, an inner race 22, and rolling elements 23 therebetween.

A tubular sleeve 24 is mounted in the bore 12 in such a manner as to be axially slidable. A hydrostatic bearing 25 lies between the outer surface of the sleeve and the bore 12 to provide for the sliding movement of the sleeve in the bore. The outer race 21 of the ball bearing 18 is fixed relative to the sleeve 24 by virtue of its engagement with an inwardly-extending flange 26.

An outwardly-extending flange 27 of the sleeve faces toward an annular chamber 28 which is connected to a hydraulic pressure means 29 which provides it with fluid under pressure. Rubber O-rings 31 and 32 reside in suitable annular grooves in the spindle; these O-rings engage the surface of the bore, and between them lies the hydrostatic bearing 25. A source 33 of oil-spray mist is connected by passages 34 to nozzles 35 and 36 which are directed toward the bearings 16 and 17, respectively. A rubber O-ring 37 is located on the spindle on the opposite side of the chamber 28 from the O-ring 31.

Referring to FIG. 2, it can be seen that the sleeve is formed with four flats which form pockets 38, 39, 41, and 42 which are connected by passages 43 to the hydraulic pressure means 29. One end of the pockets is formed by a land 44, the outer edge of which is slightly spaced (.002") from the surface of the bore 12. At the other side of the land, the sleeve is provided with a collection groove 45 which, in turn, is connected to drain.

The hydraulic pressure means 29 consists of a pump 46 connected through a pressure regulating valve 47 (having an adjusting knob 51) to the chamber 28 and to a gage 48. The pump is also connected through a restrictor 49 to the passages 43 leading to the passages 38, 39, 41, and 42.

The operation of the apparatus will now be readily understood in view of the above description. The driving of the pump produces fluid pressure (500 p.s.i.). The pressure regulating valve 47 converts this primary pressure to a desired value (50 p.s.i. to 500), and this is not only introduced into the chamber 28, but also indicated on the gage 48. The pressure in the chamber 28 presses against the facing radial surface of the flange 27. The sleeve is pressed to the right, and the flange 26 presses the outer race 22 also to the right. The outer race of the bearing unit 19 is also moved because of a small sleeve between the two outer races. The hydrostatic bearing 25 serves to float the sleeve, so that it slides smoothly in the bore. In order to change the value of the preload, it is only necessary to turn the adjusting knob 51. This can be done to match the preload force to the speed of the spindle.

With the present invention there is no Coulomb friction, which causes sticking, but only viscous friction of the hydrostatic oil and elastic shear (visco-elastic friction) in the O-rings on the sleeve. Both of the latter types of friction are desirable for damping. The viscosity of the hydrostatic fluid around the outer race sleeve and the O-ring seals provides excellent damping in the axial direction, due to large area fluid shear damping and the visco-elastic damping at the seals. Damping also takes place in the radial direction, due to the squeeze film damping of the hydrostatic fluid between the sleeve and the housing.

The present invention also allows the preload force on the bearings to be adjusted, even while the spindle is running; this is particularly advantageous in those cases where the spindle speed is to be changed. It is important to reduce the preload when the spindle speed is reduced in order to reduce wear and retain life of the anti-friction bearing. To obtain the necesary rigidity at low spindle speeds, the preload of the bearings must be increased. The change in preload can be readily accomplished by adjusting the pressure regulator and reading the value on the pressure gage; in the prior art designs, it was necessary to disassemble the toolhead in order to change the preload force on the bearings.

Another advantage of this invention is that axial vibration of the spindle may be "tuned out." The spindle mass with axial spring constant of the bearings form a vibrating system with a natural frequency of $$n = 2\pi \sqrt{\frac{\text{Spring constant}}{\text{Mass of rotor}}}$$

At certain spindle speeds (close to the natural frequency) an axial chatter might occur, but with the ability to change the preload remotely, the spring constant of the bearings may be changed (ball bearings have a non-linear rigidity characteristic), thus moving the system out of resonance.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A toolhead, comprising
   (a) a housing having a bore extending therethrough,
   (b) a spindle rotatably mounted in the bore and extending therefrom,
   (c) an anti-friction bearing between the spindle and the bore, the bearing having an outer race, an inner race, and rolling elements therebetween,
   (d) a sleeve axially slidably mounted in the bore, the outer race being fixed in the sleeve and the inner race being fixed to the spindle,
   (e) hydraulic pressure means for causing fluid pressure to bear against the sleeve, and
   (f) a hydrostatic bearing located between the sleeve and the bore to provide for the said sliding movement of the sleeve in the bore, the hydrostatic bearing consisting of pockets to which pressure fluid is introduced, one end of the pockets being formed by a flange on the sleeve whose outer edge lies closely adjacent the surface of the bore.

2. A toolhead as recited in claim 1, wherein the pockets are defined by forming flats on the surface of the spindle immediately adjacent the flange.

3. A toolhead as recited in claim 1, wherein the bearing is a ball bearing, the rolling elements are balls, and the races are provided with annular grooves in which the balls ride.

4. A toolhead as recited in claim 1, wherein the sleeve is of elongated tubular form having elastomer O-rings at the ends directly engaging the surface of the bore.

5. A toolhead as recited in claim 1, wherein the sleeve has an inwardly-directed flange engaged by the outer race of the bearing and an outwardly-directed flange against which the fluid pressure bears.

References Cited
UNITED STATES PATENTS

| | | | |
|---|---|---|---|
| 3,211,060 | 10/1965 | McCann | 308—207.1 |
| 3,574,424 | 4/1971 | Hagemeister | 308—189 |
| 3,558,199 | 1/1971 | Reiser | 308—207 |

MARTIN P. SCHWADRON, Primary Examiner

F. SUSKO, Assistant Examiner